(No Model.)

W. P. HARRISON.
REEL FOR CHAIN PUMPS.

No. 272,433.   Patented Feb. 20, 1883.

Witnesses:
N. W. Mortimer
Will A. Kern

Inventor:
Wm. P. Harrison
per
F. A. Lehmann,
Atty.

UNITED STATES PATENT OFFICE.

WILLIAM P. HARRISON, OF COLUMBUS, OHIO.

REEL FOR CHAIN-PUMPS.

SPECIFICATION forming part of Letters Patent No. 272,433, dated February 20, 1883.

Application filed June 12, 1882. (No model.)

*To all whom it may concern:*

Be it known that I, WILLIAM P. HARRISON, a citizen of the United States, residing at Columbus, in the county of Franklin and State of Ohio, have invented certain new and useful Improvements in Reels for Chain-Pumps, of which the following is a specification, reference being had therein to the accompanying drawings.

My invention relates to an improvement in reels for chain-pumps; and it consists in the construction of prongs so as not only to guide but firmly hold the chain when the reel is turned, to prevent its slipping, as will be fully described hereinafter.

In chain-pumps heretofore in use great fault is found on account of the slipping of the chains over the reel, especially at the starting of the motion, but also during cold weather, when ice is formed on both chain and reel. This slipping of the chain is owing to the form of the prongs by which the chain is raised and guided. The construction of these prongs is such that they cannot hold the chain, and the raising of it depends entirely on the catching of the links as they are successively brought in contact with the prongs. So long as the chain is new and its links rough and but little worn it works tolerably well; but when by long use the chain becomes smooth it slides over the prongs of the reel without being raised by it, and this fault is much increased by ice when formed on the reel, as it frequently does during cold weather.

The accompanying drawings represent my invention.

Figure 1:
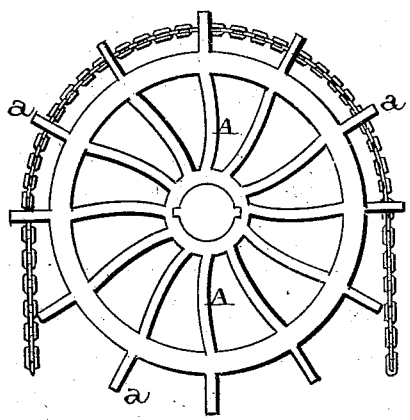
Figure 2:
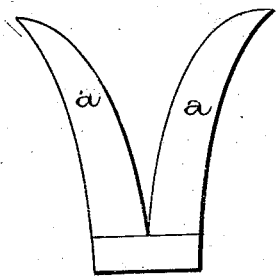
Figure 3:
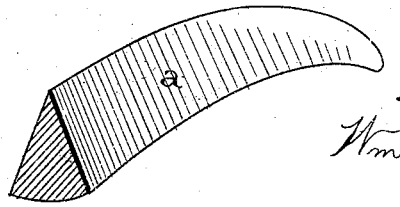

Figure 1 is a side elevation of the reel. Figs. 2 and 3 are detail views of the same.

The reel A, constructed as usual, has inserted at its periphery a number of prongs, *a*, in which the chain is placed, and by which it is moved when the reel is turned. The prongs, as shown, have each two branches or arms gradually diverging from each other by curved convex lines. At the point of separation these lines form an acute angle, and are but slightly curved; but the curvature increases toward the upper part, whereby the expansion is more rapidly extended.

The object of this construction of the prongs is to compress and seize the chain in the narrowing fork, and there to hold it until by the rotation of the reel it is dropped from it at the opposite side; and to add to the effectiveness of this form of the prongs the inner edges of both branches or arms are made sharp. Consequently when in contact with the chain they more or less impinge upon it, and thereby prevent its slipping. The sharp edges, when the reel is covered by ice, cut or break it off, so that there is no impediment from that source.

The essential difference between my invention and the existing reels for chain-pumps consists in the narrowness and depth of the division between the arms of the prongs and in the sharpness of their inner edges, so as to seize and hold the chain, and thus to prevent its slipping.

Having thus described my invention, I claim—

1. A reel for chain-pumps having prongs which are sharpened on their inner edges and which narrow gradually from their inner to their outer ends, substantially as shown.

2. A reel for chain-pumps having arms or prongs which are triangular in cross-section, so as to bite into the links of the chain, substantially as set forth.

In testimony whereof I affix my signature in presence of two witnesses.

WILLIAM P. HARRISON.

Witnesses:
C. H. WHITE,
S. TAYLOR.